(12) United States Patent
Roychoudhury et al.

(10) Patent No.: US 9,174,382 B2
(45) Date of Patent: Nov. 3, 2015

(54) HOLLOW ARTICLE WITH PILLAR STRUCTURAL MEMBERS

(75) Inventors: Raj S. Roychoudhury, Bloomfield Hills, MI (US); Stephen Hawkins, South Lyon, MI (US)

(73) Assignee: Salflex Polymers LTD., Weston, Ontario (CA)

( * ) Notice: Subject to any disclaimer, the term of this patent is extended or adjusted under 35 U.S.C. 154(b) by 342 days.

(21) Appl. No.: 13/150,854

(22) Filed: Jun. 1, 2011

(65) Prior Publication Data

US 2012/0177876 A1 Jul. 12, 2012

Related U.S. Application Data

(60) Provisional application No. 61/432,069, filed on Jan. 12, 2011.

(51) Int. Cl.

| | | |
|---|---|---|
| B29C 49/30 | (2006.01) | |
| B29C 49/42 | (2006.01) | |
| B29C 49/04 | (2006.01) | |
| B29C 49/22 | (2006.01) | |
| B29C 49/48 | (2006.01) | |
| B32B 7/04 | (2006.01) | |
| B32B 25/04 | (2006.01) | |
| B32B 27/08 | (2006.01) | |
| B32B 27/30 | (2006.01) | |
| B32B 27/32 | (2006.01) | |

(Continued)

(52) U.S. Cl.
CPC ............ *B29C 49/4268* (2013.01); *B29C 49/04* (2013.01); *B29C 49/22* (2013.01); *B29C 49/4815* (2013.01); *B32B 3/02* (2013.01); *B32B 3/28* (2013.01); *B32B 7/045* (2013.01); *B32B 25/04* (2013.01); *B32B 27/08* (2013.01); *B32B 27/302* (2013.01); *B32B 27/32* (2013.01); *B32B 27/34* (2013.01); *B32B 2250/02* (2013.01); *B32B 2264/065* (2013.01); *B32B 2264/10* (2013.01); *B32B 2264/101* (2013.01); *B32B 2264/104* (2013.01); *Y10T 428/24149* (2015.01)

(58) Field of Classification Search
None
See application file for complete search history.

(56) References Cited

U.S. PATENT DOCUMENTS

| | | | |
|---|---|---|---|
| 6,060,144 A | 5/2000 | Kimura et al. | |
| 7,153,127 B2 * | 12/2006 | Struble et al. | 425/525 |

(Continued)

FOREIGN PATENT DOCUMENTS

| | | |
|---|---|---|
| JP | S59150849 A | 8/1984 |
| JP | H01-204871 | 8/1989 |

(Continued)

OTHER PUBLICATIONS

Written Opinion and International Search Report for related International Application No. PCT/CA2011/000647, report dated Sep. 16, 2011.

(Continued)

*Primary Examiner* — Monica Huson
(74) *Attorney, Agent, or Firm* — Miller, Matthias & Hull LLP

(57) ABSTRACT

A hollow article is provided, comprising a first wall and a second wall, where the first and second walls are positioned in opposing relationship and define a space therebetween. A plurality of protruding structural pillars extend from the second wall and span the space, each of the structural pillars having an end surface integrally bonded with an inside surface of the first wall.

19 Claims, 24 Drawing Sheets

(51) Int. Cl.
    *B32B 27/34*   (2006.01)
    *B32B 3/02*    (2006.01)
    *B32B 3/28*    (2006.01)

(56) References Cited

U.S. PATENT DOCUMENTS

| | | |
|---|---|---|
| 7,455,512 B2 | 11/2008 | Huang |
| 2007/0160779 A1 | 7/2007 | Obara |
| 2008/0036122 A1* | 2/2008 | Hawkins ................. 264/518 |

FOREIGN PATENT DOCUMENTS

| | | |
|---|---|---|
| JP | 05-254001 | 5/1993 |
| JP | 06-071738 | 3/1994 |
| JP | H06-179236 | 6/1994 |
| JP | H08-39659 | 2/1996 |
| JP | H08-57944 | 3/1996 |
| JP | H08-99348 | 4/1996 |
| JP | H-08294957 A | 11/1996 |
| JP | H-08323849 A | 12/1996 |
| JP | H-0911324 A | 1/1997 |
| JP | H09-76335 | 3/1997 |
| JP | H09-99483 | 4/1997 |
| JP | H09-123261 | 5/1997 |
| JP | H-09150849 A | 6/1997 |
| JP | H10-217320 | 8/1998 |
| JP | H10-235720 | 9/1998 |
| JP | 2000-071322 | 3/2000 |
| JP | 2002-029338 | 1/2002 |
| JP | 2002-187505 | 2/2002 |
| JP | 2002-210809 | 7/2002 |
| JP | 2003-165152 | 6/2003 |
| JP | 2004-149075 | 5/2004 |
| JP | 2005-067303 | 3/2005 |
| JP | 2007504037 A | 3/2007 |
| WO | 93/18906 | 9/1993 |
| WO | 94/12334 | 6/1994 |
| WO | WO 95/13938 | 5/1995 |

OTHER PUBLICATIONS

Extended European Search Report, EP Appl No. 11 855 831.1, Jan. 23, 2015.
T. Imai; Office Action for related Japanese Application No. 2013-548707; Mar. 6, 2015; 9 pages.

* cited by examiner

HOLLOW ARTICLE WITH PILLAR STRUCTURAL MEMBERS

CROSS-REFERENCE TO RELATED APPLICATIONS

This application claims benefit under 35 U.S.C. 119(e) to U.S. Provisional Patent Application No. 61/432,069, filed Jan. 12, 2011, entitled "Blow Molded Article," which is incorporated by reference herein in its entirety.

FIELD OF THE INVENTION

The present invention relates to hollow articles with internal structural pillars, and processes for manufacture.

BACKGROUND OF THE INVENTION

Blow molded hollow articles with internal features are generally made by a conventional blow molding process using molds with fixed protrusions. The disadvantage of this approach is that the surface of the molded part has open features that have an aesthetically unpleasant appearance. In addition, a substantially planar surface is not available for bonding a covering when open features are located on the first or the second surface of a hollow part.

Blow molded hollow articles with internal ribs are known, and can be made using conventional, blow molding processes. Such techniques are employed in the manufacture of hollow load bearing structures such as carpeted load floors used in automobiles. In a known process, a carpeted load floor is formed by placing a carpet in the mold, and then inflating a parison onto one or more blades to form a hollow article with at least one internal fused rib, and a bonded carpet on one side and along edges.

While the use of internal ribs provides some resistance to part deflection, improvements are required to make a lighter weight blow molded hollow article with an internal structure that has a lower cost, higher stiffness and thinner section for a given mass than a part made by a conventional blow molding process.

SUMMARY OF THE INVENTION

According to an aspect of an embodiment, provided is a hollow article, comprising a first wall and a second wall, where the first and second walls are positioned in opposing relationship and define a space therebetween. A plurality of protruding structural pillars extend from the second wall and span the space, each of the structural pillars having an end surface integrally bonded with an inside surface of the first wall.

According to another aspect of an embodiment, provided is a process for producing a hollow article. The process comprises positioning a parison between a first mold half and a second mold, the first and second mold half together defining a cavity for forming the hollow article. The second mold half provides a plurality of displaceable core pins extendable into the cavity. Either prior to, during or post complete mold tool closure, the core pins are extended into the parison so as to form corresponding protrusions, wherein the protrusions have an end surface that engages and integrally bonds with an opposing inside surface of the parison. A pressurized gas is introduced into the parison so as to cause the parison to bear against the cavity to form the hollow article. The first and second mold halves are opened, and the hollow article is released.

According to a further aspect of an embodiment, provided is a hollow article comprising a first wall and a second wall positioned in opposing relationship and defining a space therebetween. A covering is integrally bonded to an outside surface of the first wall, and a plurality of protruding structural pillars are formed into the second wall. Each of the structural pillars are configured to span the space and have an end surface that is integrally bonded with an inside surface of the first wall.

BRIEF DESCRIPTION OF THE DRAWINGS

The foregoing and other features and advantages of the invention will be apparent from the following description of the invention as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION OF EMBODIMENTS OF THE PRESENT INVENTION

Specific embodiments of the present invention will now be described with reference to the Figures, wherein like reference numbers indicate identical or functionally similar elements. The following detailed description is merely exemplary in nature and is not intended to limit the invention or the application and uses of the invention. A person skilled in the relevant art will recognize that other configurations and arrangements can be used without departing from the scope of the invention. Although the description and drawings of the embodiments hereof exemplify the formation/use of structural pillars in load floors, the invention may also be used in other molding arrangements where it is deemed useful. Furthermore, there is no intention to be bound by any expressed or implied theory presented in the preceding technical field, background, brief summary or the following detailed description.

Figure 1:
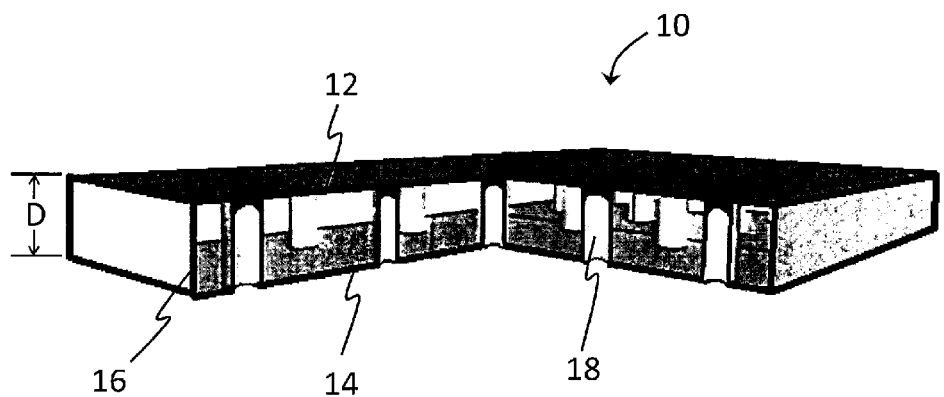
FIG. 1 is a partial sectional perspective view of a hollow article in accordance with an embodiment hereof showing the structural pillars.

Turning now to FIG. 1, shown in partial-sectional perspective view is a hollow article 10 according to an embodiment of the invention. More specifically, shown is an exemplary article known as a load bearing structural floor commonly used in motor vehicles. Hollow article 10 generally comprises a first wall 12, a second wall 14 and an edgewall 16. First and second walls 12, 14 are configured to be spaced-apart by a predetermined amount D, with edgewall 16 generally spanning the separation between first and second walls 12, 14 around the perimeter of hollow article 10.

To provide enhanced structural rigidity between first and second walls 12, 14 hollow article 10 is further provided with a plurality of tack off structures, each generally referred to herein as a structural pillar 18. As will be detailed below, structure pillar 18 is formed as an extension of second wall 14, and is dimensioned to span the separation between first and second walls 12, 14 such that the tip face of structural pillar 18 engages and bonds with the inside surface of first wall 12. As such, each structural pillar 18 provides a fixed attachment between first and second walls 12, 14.

Figure 2A:
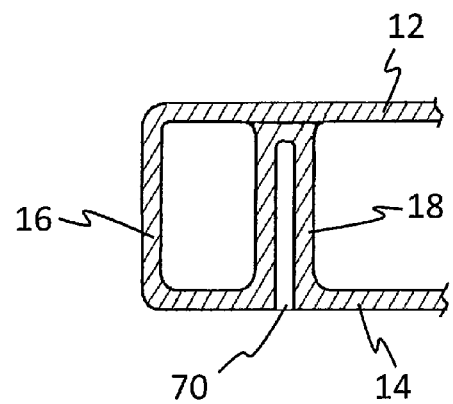
FIG. 2a is a partial sectional view of a hollow article having a hollow core structural pillar.
Figure 2B:
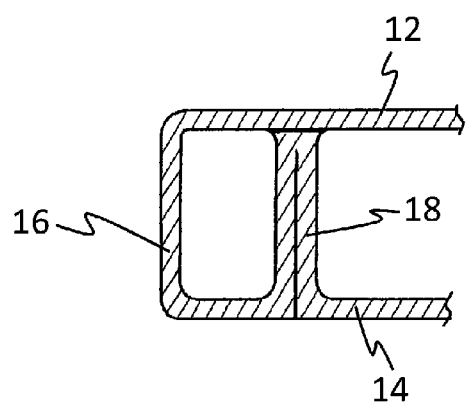
FIG. 2b is a partial sectional view of a hollow article having a solid core structural pillar.
Figure 2C:
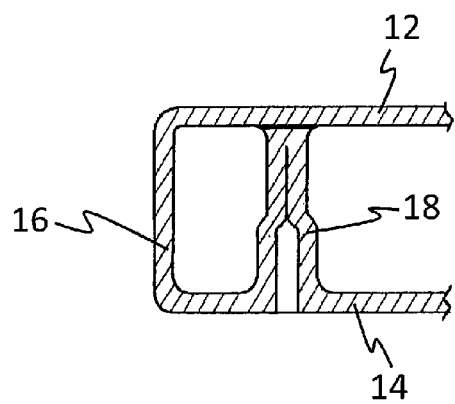
FIG. 2c is a partial sectional view of a hollow article having a partial-hollow core structural pillar.

Structural pillar 18 may be presented in a number of forms, depending on the process of manufacture and desired performance requirement. For example, structural pillar 18 may be provided as a hollow structural pillar 18 as shown in FIG. 2a, or a solid structural pillar 18 as shown in FIG. 2b. In further embodiments, structural pillar 18 may take on an intermediate form where the central region of the pillar is partially hollow, as shown in FIG. 2c.

Figure 3A:
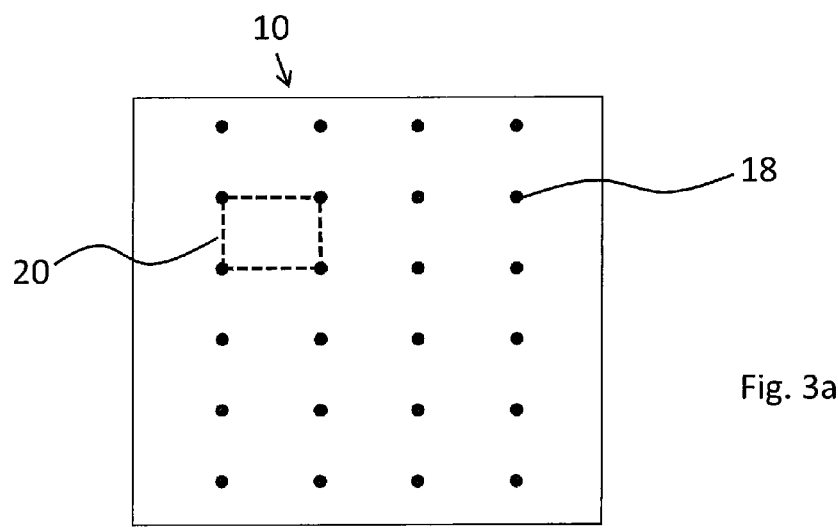
FIG. 3a is a schematic representation of a hollow article showing a rectangular arrangement of the structural pillars.
Figure 3B:
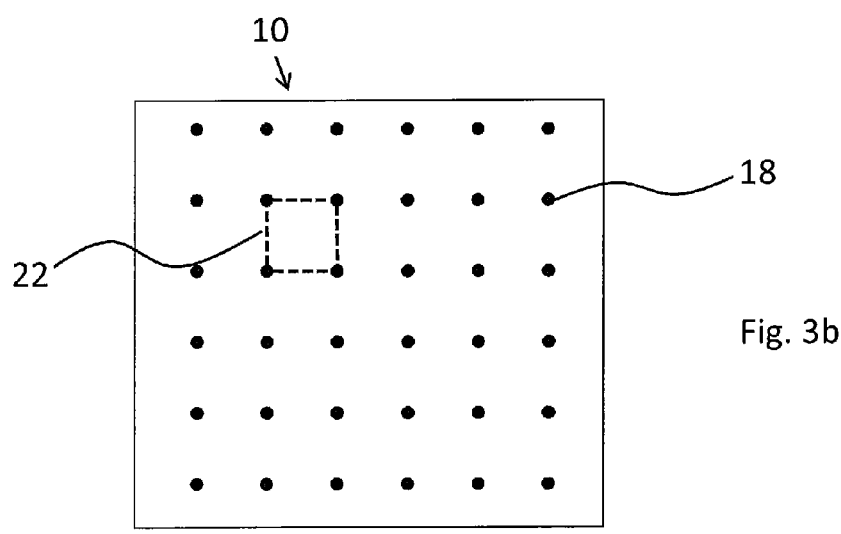
FIG. 3b is a schematic representation of a hollow article showing an equidistant co-linear arrangement of the structural pillars.
Figure 3C:
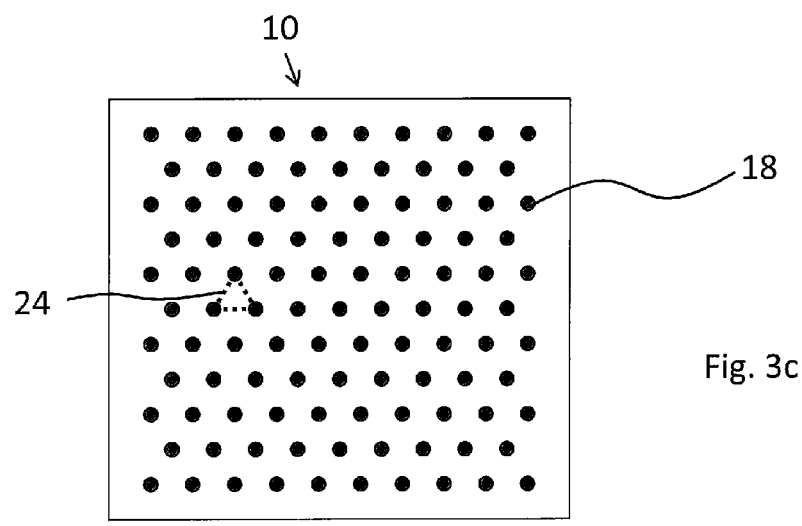
FIG. 3c is a schematic representation of a hollow article showing a triangular arrangement of the structural pillars.
Figure 3D:
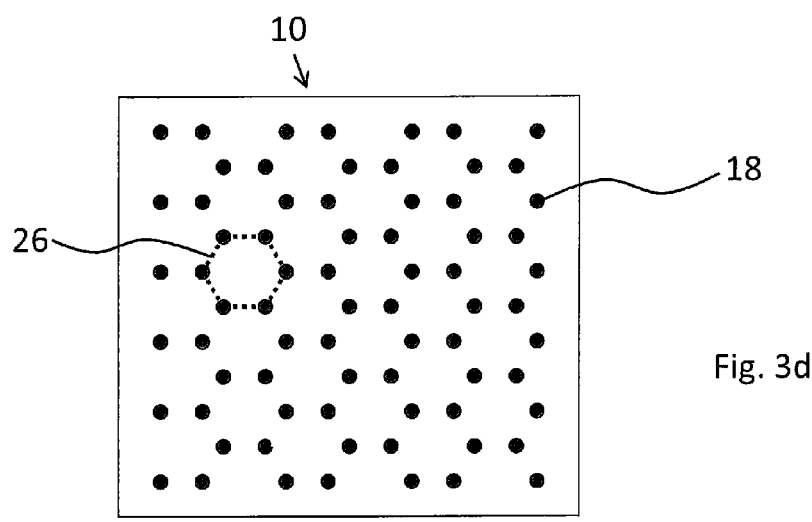
FIG. 3d is a schematic representation of a hollow article showing a honeycomb (hexagonal) arrangement of the structural pillars.
Figure 3E:
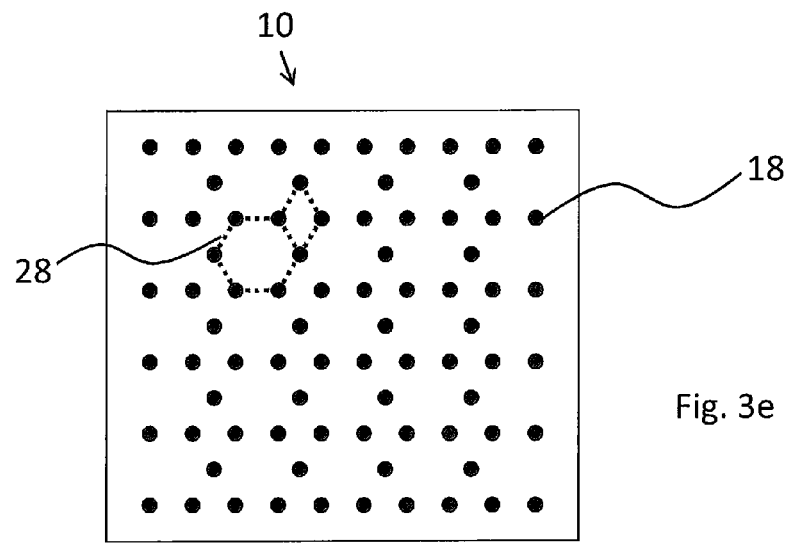
FIG. 3e is a schematic representation of a hollow article showing a modified honeycomb (hexagonal) arrangement of the structural pillars.
Figure 3F:
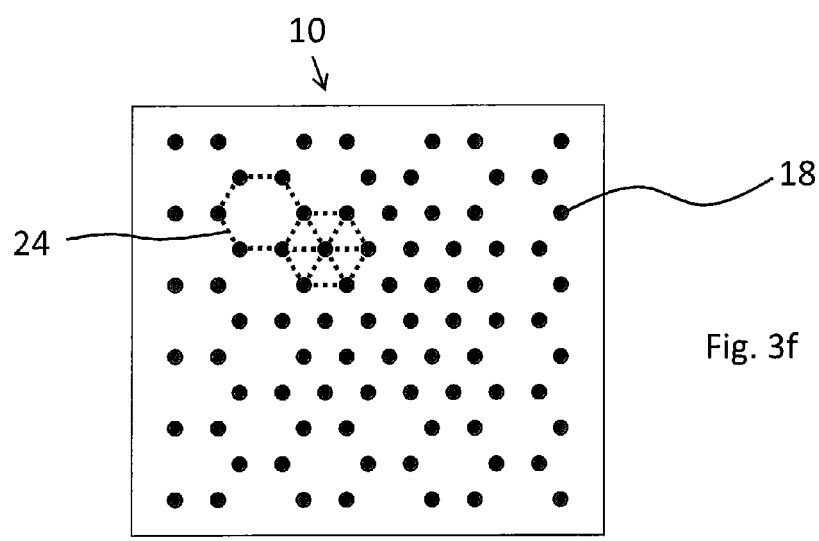
FIG. 3f is a schematic representation of a hollow article showing a combined triangular/honeycomb (hexagonal) arrangement of the structural pillars.
Figure 3G:
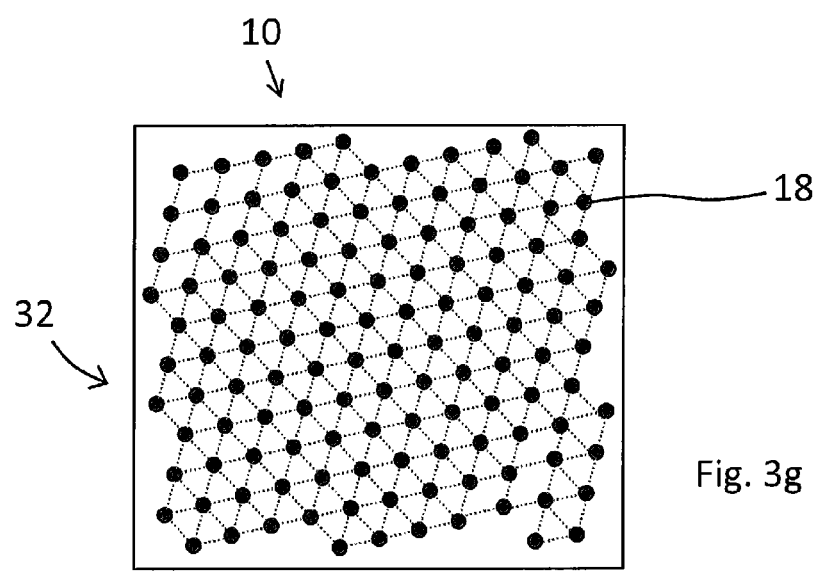
FIG. 3g is a schematic representation of a hollow article showing a skewed arrangement of the structural pillars.

As indicated above, structural pillar 18 is provided in the form of a plurality of structural pillars arranged in a pattern, generally but not limited to a geometric array, within hollow article 10 between first and second walls 12, 14. Exemplary structural pillar arrangement patterns in a hollow article 10 are shown in FIGS. 3a through 3e, where the choice of arrangement pattern is dependent upon desired performance characteristics. As shown, provided is a rectangular arrangement 20 (FIG. 3a), an equidistant collinear (e.g. square) arrangement 22 (FIG. 3b), a triangular arrangement 24 (FIG. 3c), a polygonal (e.g. hexagonal) arrangement 26 (FIG. 3d), and a modified polygonal (e.g. hexagonal) arrangement 28 (FIG. 3e). As will be appreciated, higher density arrangements, such as the triangular arrangement 24 shown in FIG. 3c may be implemented where enhanced structural rigidity is required. In a light-weight load bearing article, or one where a lower overall rigidity is permissible, a lower density arrangement, such as the polygonal arrangement 26 shown in FIG. 3d may be used. Modifications and combinations of the pattern provides further structural characteristics that may be implemented to meet the desired performance characteristics of the article in questions, for example a load floor. Exemplary modifications/combinations include a combined triangular/polygonal pattern 30 shown in FIG. 3f. In some embodiments, the support structure upon which the load bearing article is mounted dictates a customized orientation of the geometric array, such as the skewed arrangement 32 shown in FIG. 3g, where linear patterns within the arrangement are generally non-parallel to one or more edgewalls.

Figure 4A:
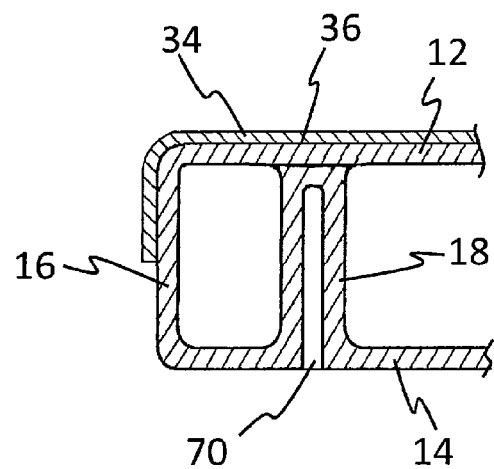
FIG. 4a is a partial sectional view of a hollow article according to the embodiment of FIG. 2a, having a covering positioned on the first wall.

In some applications, it is desirable to have a covering material applied to one side of the hollow structure. For example, it may be desirable to apply a carpet material to one side of the hollow structure so as to meet desired performance and/or aesthetics characteristics. As such, provided in FIG. 4*a* is an alternate embodiment of hollow article 10 where a covering 34 is provided on outside surface 36 of first wall 12. As will be detailed below, covering 34 is integrally bonded to first wall 12 of hollow article 10 through the blow molding process. Covering 34 may in fact be a wide range of materials, including but not limited to carpet (woven or non-woven) and sheets of varying forms such as solid and perforated configuration. Suitable materials for coverings include, but are not limited to polypropylene, polyester, polyamide, vinyl and TPO.

Figure 4B:
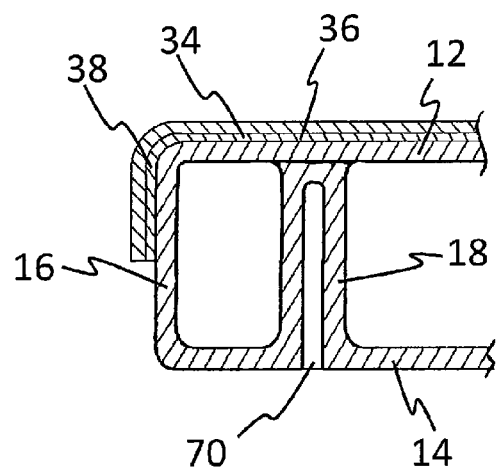
FIG. 4b is a partial sectional view of a hollow article according to the embodiment of FIG. 2a, having a covering and reinforcement layer positioned on the first wall.
Figure 4C:
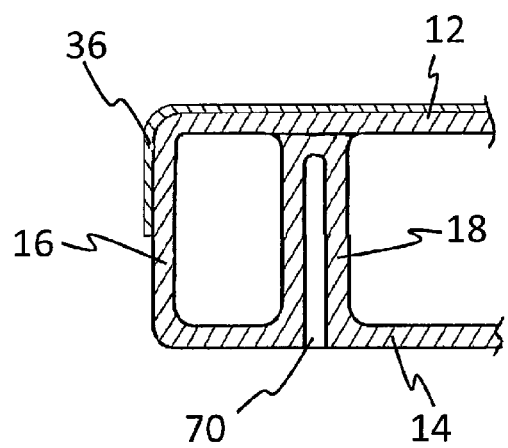
FIG. 4c is a partial sectional view of a hollow article according to the embodiment of FIG. 2a, having a reinforcement layer positioned on the first wall.

In addition or as an alternative to covering 34, one or more reinforcement layers may be integrally bonded to outside surface 36 of first wall 12. In the embodiment shown in FIG. 4*b*, a single reinforcement layer 38 is provided as an intermediate layer between outside surface 36 of first wall 12, and covering 34. In the embodiment shown in FIG. 4*c*, a reinforcement layer 38 is integrally bonded to outside surface 36 of first wall 12 without a further covering material added. Exemplary reinforcement layers include, but are not limited to mesh, fabric and plastic. Exemplary mesh materials include metal, glass, plastic and carbon fibre. Exemplary fabrics may be woven or non-woven, and may include synthetic and/or non-synthetic materials, such as, but not limited to hemp, jute and leather. Exemplary plastics may include polyamide (e.g. aramid), and any filled synthetic resin containing organic or inorganic fillers, such as, but not limited to talc, mica, carbon fiber and glass. Reinforcement layer 38 may be continuous over the entire surface, or may be discontinuous, that is only partially cover the article. In some embodiments, reinforcement layer 38 may alternatively or additionally be provided on an outside surface of second wall 14. As such, to accommodate for passage of core pins on forming the structural pillars, reinforcement layer 38 may be provided with suitably sized and positioned openings, or may provide a mesh sizing suitable to allow for passage of the core pins.

Figure 5:
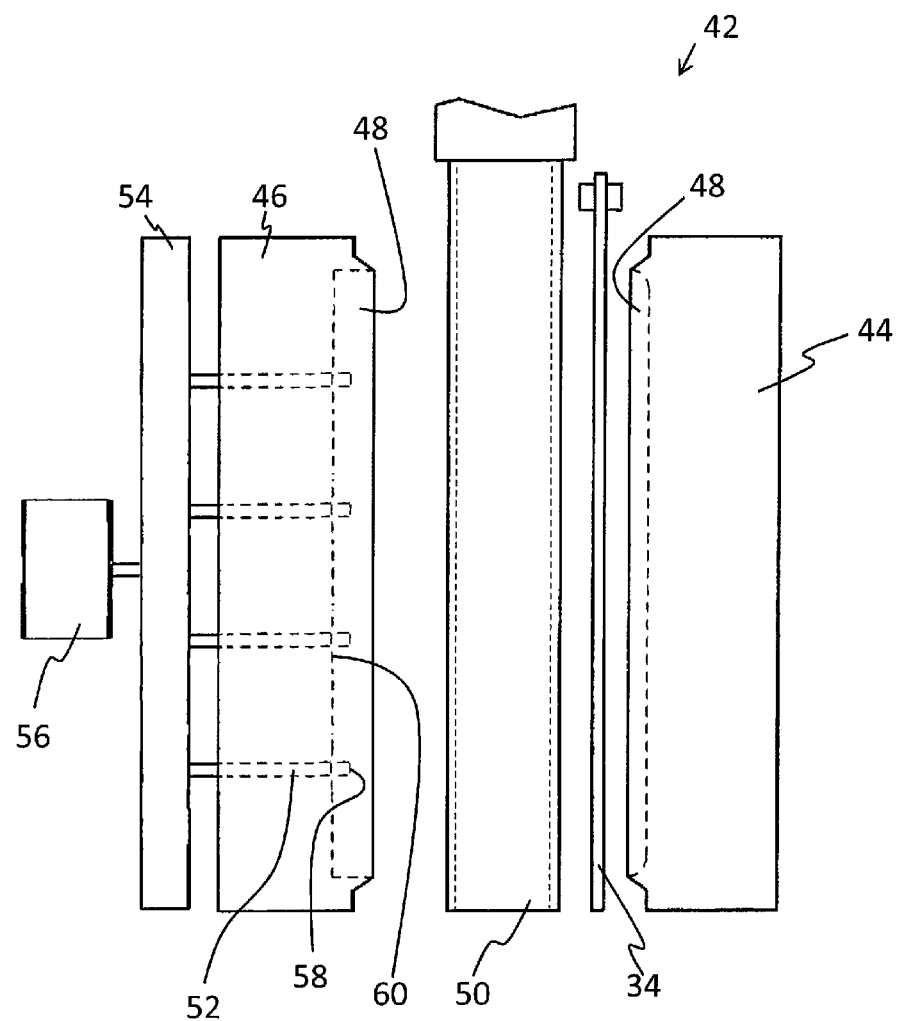
FIG. 5 is a partial elevational view of a mold tool in accordance with an embodiment hereof showing the relationship between the core pins and the second mold half.

A process for manufacturing the hollow structure having a carpet covering provided on one surface will now be presented having regard to FIGS. 5 through 9. As shown in FIG. 5, a mold tool 42 for forming hollow article 10 comprises two mold halves, namely first mold half 44 and second mold half 46 which together in closed configuration define a mold cavity 48 for forming the desired article. Positioned in relation to mold tool 42 is an extruder (not shown) for delivering a parison 50 to mold tool 42. While an extruder may be positioned in-line relative to mold tool 42, it will be appreciated that a transport means, for example a robot or similar manipulator device, may be provided to transport an extruded parison to mold tool 42.

Provided in second mold half 46 are a plurality of slidably displaceable core pins 52 for forming structural pillars 18. Core pins 52 are configured to protrude and retract from mold cavity 48 so as to form the above-mentioned extensions of second wall 14, each defining a corresponding structural pillar 18. To facilitate movement of core pins 52, core pins 52 are coupled to a common yoke plate 54 capable of lateral displacement through the action of one or more actuators 56. As will be appreciated, the stroke provided by the one or more actuators may be adjustable for allow for accurate positioning of end surface 58 of core pin 52 relative to the fully extended and fully retracted positions. For example, in the retracted position, end surface 58 may be partially protruding, flush, or partially recessed from cavity surface 60 to provide for desired finished product surface characteristics. It will be further appreciated that while a single yoke plate may be used to control the plurality of core pins, multiple yoke plates may be implemented to control 'banks' or groupings of core pins. Still further, in some embodiments, each core pin may be controlled by an independent actuator.

Continuing with FIG. 5, parison 50 is positioned between first and second mold halves 44, 46 of mold tool 42, with covering 34 being positioned between first mold half 44 and parison 50. Either prior to mold tool 42 closure, simultaneously with mold tool 42 closure, or subsequent to mold tool 42 closure, yoke plate 54 is displaced towards second mold half 46 so as to protrude core pins 52 from the cavity surface 60. In the embodiment shown, core pins 52 are partially protruded from cavity surface 60 prior to mold tool 42 closure, and are fully extended to the desired position prior to complete closure of mold tool 42. In other embodiments, core pins 52 are partially protruded from cavity surface 60 prior to mold tool 42 closure, and are fully extended to the desired position subsequent to complete closure of mold tool 42. In still further embodiments, core pins 52 are protruded from cavity surface 60 subsequent to complete closure of mold tool 42.

Figure 6:
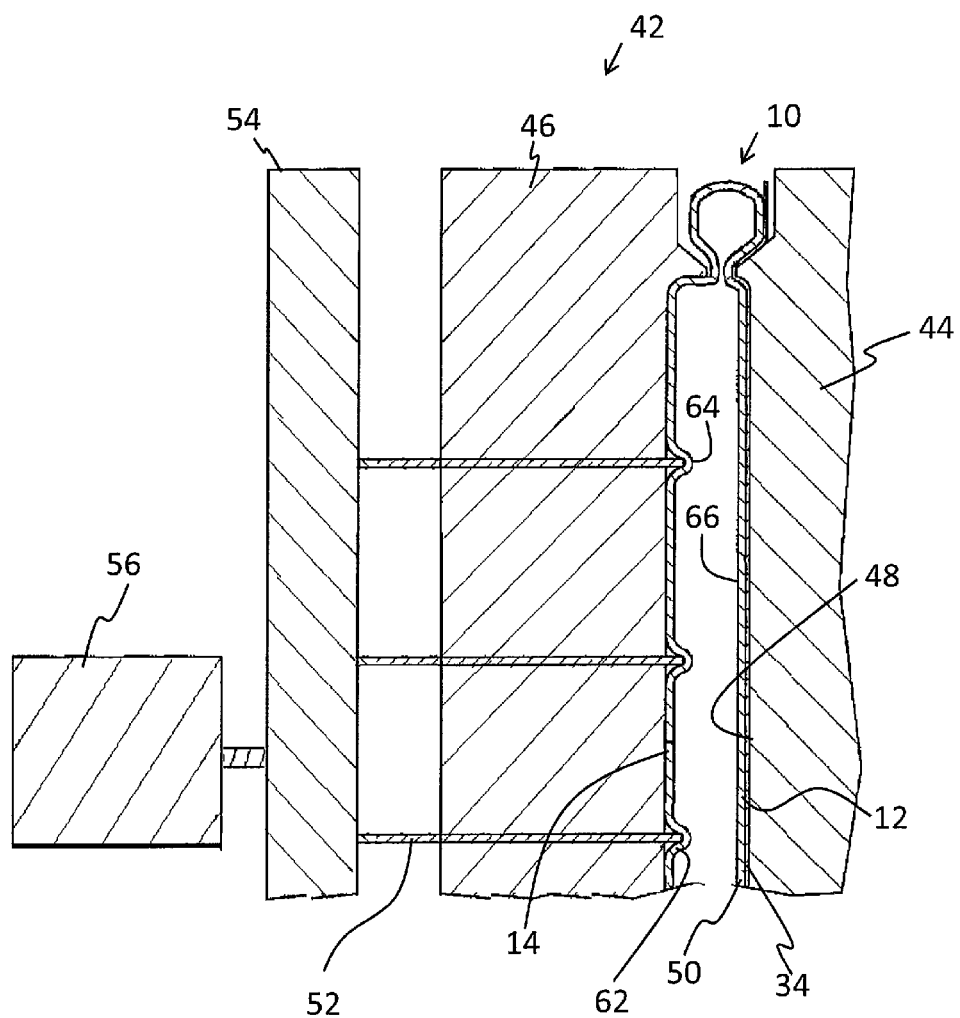
FIG. 6 is a partial sectional view of the mold tool according to FIG. 5 showing initial engagement of the parison by the core pins.
Figure 7:
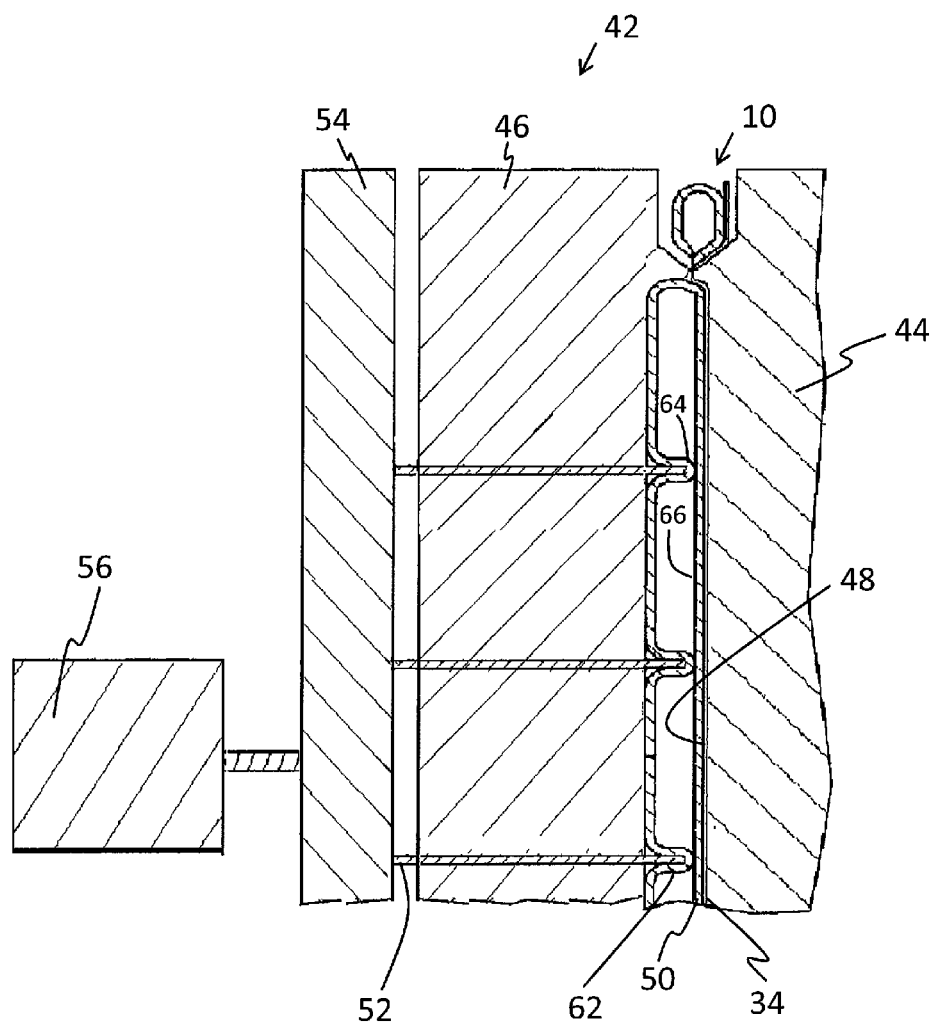
FIG. 7 is a partial sectional view of the mold tool according to FIG. 5 showing the engagement and bonding of the protrusion with the inside surface of the opposing wall on mold closure.

Partial mold tool 42 closure is represented in FIG. 6 where initial engagement of parison 50 by core pins 52 is shown. Core pins 52 push localized regions of parison 50 from the side corresponding to second wall 14 of hollow article 10 towards the opposing side, that is first wall 12. On protruding into parison 50, each core pin 52 forms into parison 50 a corresponding circumferential wall 62. The extent of protrusion of core pin 52 into parison 50 is sufficient to cause the end face 64 of the protrusion to engage and bond with inside surface 66 of first wall 12 on complete closure of mold tool 42, as shown in FIG. 7. Adjustments of the extent of protrusion can be achieved by adjusting the stroke characteristics of yoke plate(s) 54.

Figure 8:
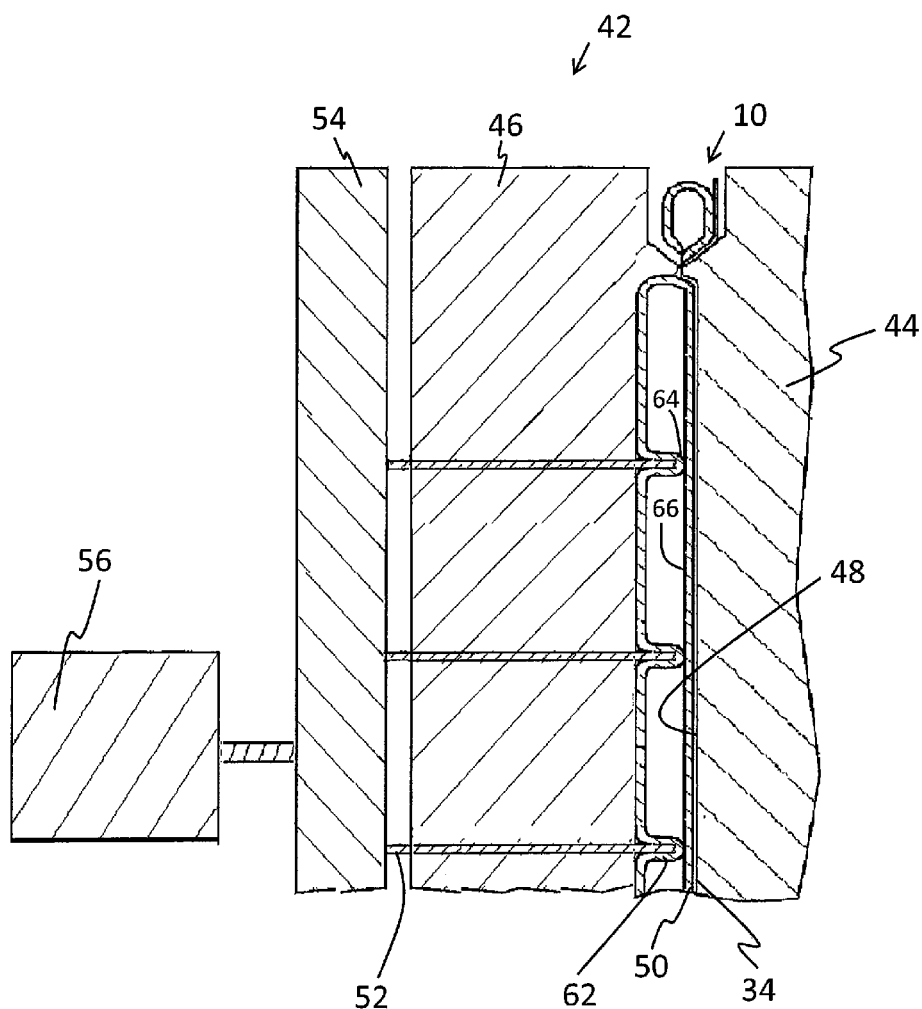
FIG. 8 is a partial sectional view of the mold tool according to FIG. 5 following blow molding of the hollow article.

As shown in FIG. 8, parison 50 is blow molded into the final desired article. As such, parison 50 is caused to bear completely against the contour of cavity 48 provided in mold tool 42, by way of pressurized gas (e.g. air) introduced through one or more blow needles or pins in fluid communication with the internal chamber formed within the sealed parison 50. Where core pins 52 are maintained in position within parison 50 on being pressurized, the finished hollow structure presents a corresponding hollow core 70, such as that shown in FIG. 2*a*. Where core pins 52 are removed prior to, or during the introduction of pressurized gas, the circumferential walls of the extension generally collapse together, causing the inside surfaces of the extension to be integrally bonded, thus forming the solid column-like structure of FIG. 2*b*. Where core pins 52 are partially retracted, the finished hollow structure presents the intermediate form of a partially hollow structural pillar, as shown in FIG. 2*c*. With covering 34 present within mold tool 42 during the blow molding step, covering 34 is integrally bonded on outside surface of first wall 12, as shown for example in FIG. 4*a*.

Figure 9:
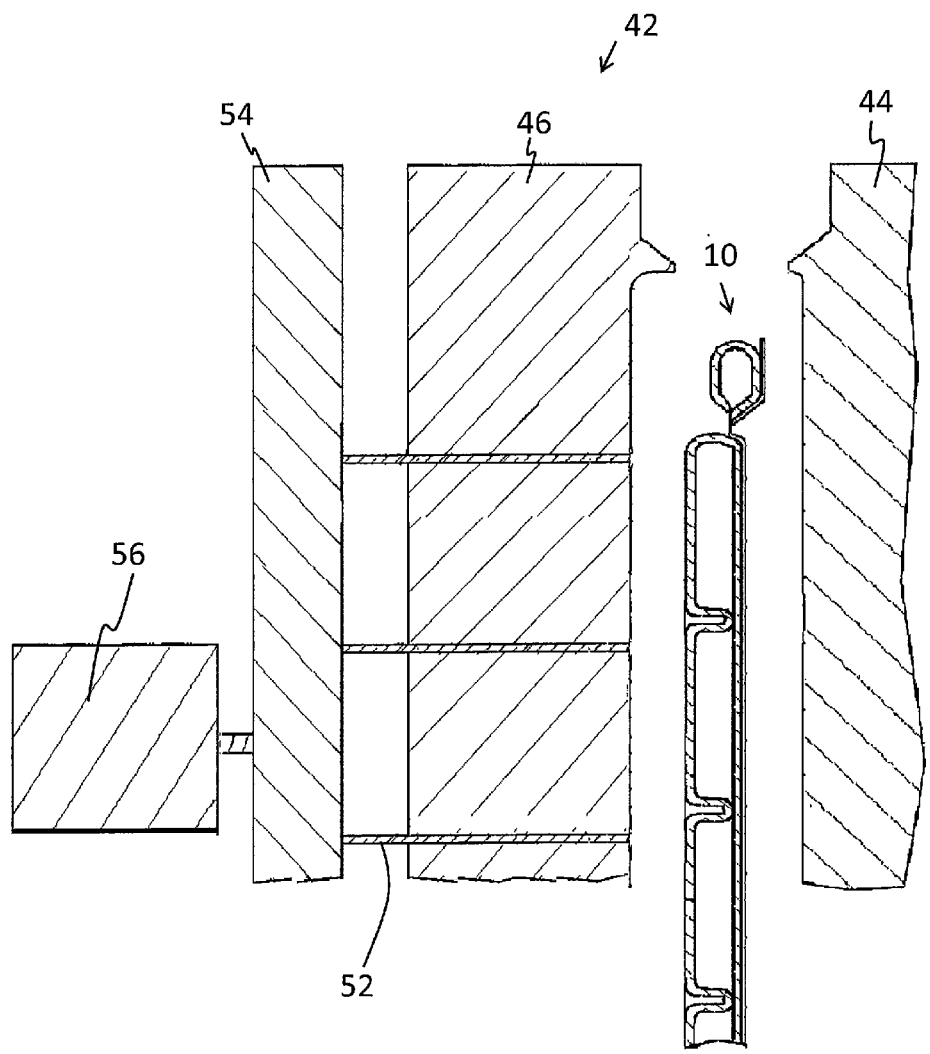
FIG. 9 is a partial sectional view of the mold tool according to FIG. 5 showing the mold halves separated and the hollow article being released.

On completion of the blow molding step, as shown in FIG. 9, core pins 52 are fully retracted if still in a protruded state, and mold tool 42 is opened. The resulting hollow article 10 is removed and subjected to any required post-mold processing to remove flashing or other waste material.

Turning now to FIGS. 10 to 14, shown is a further embodiment of the invention. Many of the various labelled parts perform in a substantially similar manner with substantially similar functions as the embodiment illustrated in FIGS. 5 to 9. Like parts have like numbers with the addition of 100 to the number. Only differences compared to the embodiment of FIGS. 5 to 9 will therefore be discussed in detail. Alterations and modifications noted above are equally applicable to the further embodiment detailed below.

Figure 10:
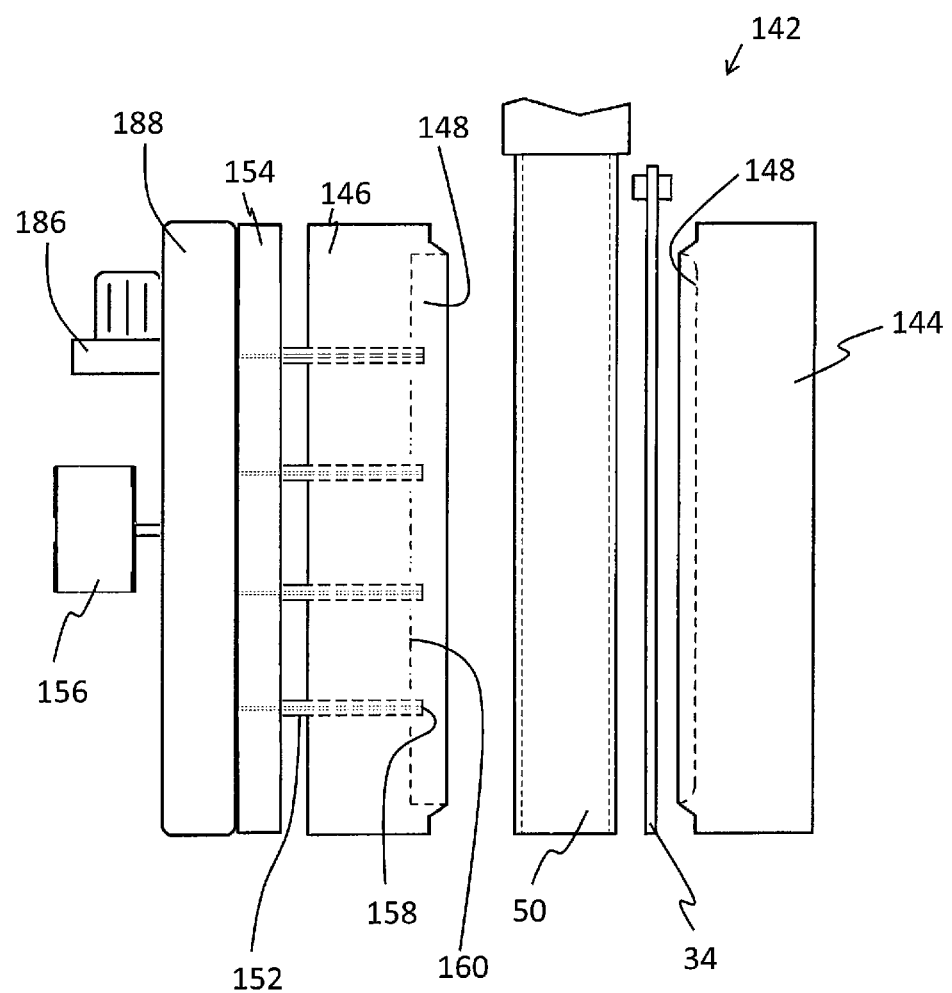
FIG. 10 is a partial elevational view of a mold tool in accordance with an embodiment hereof in which the core pins are provided with internal channels for directing air flow into the protrusions.
Figure 11:
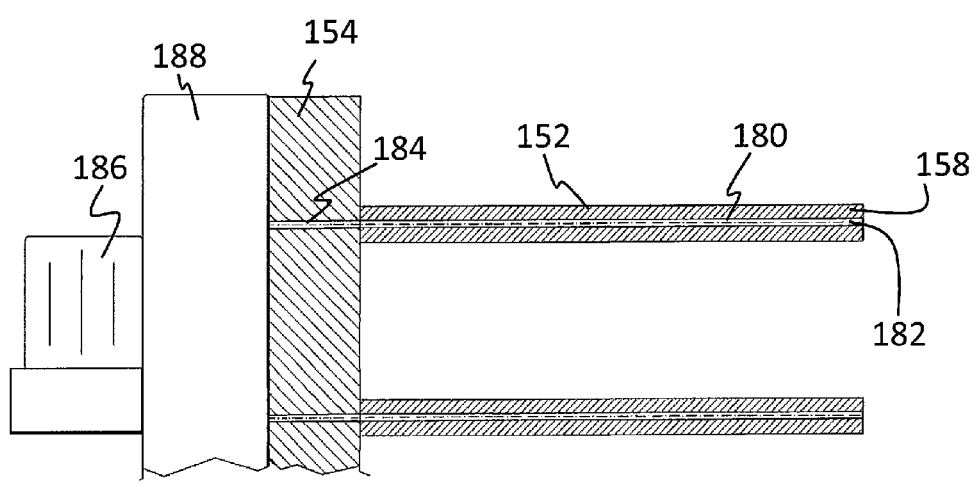
FIG. 11 is an enlarged partial sectional view of the core pin of FIG. 10.

Shown in FIG. 10 is a mold tool 142 comprising two mold halves, namely a first mold half 144 and a second mold half 146. In a closed configuration, first and second mold halves 144, 146 together define a mold cavity 148.

Provided in second mold half 146 are a plurality of slidably displaceable core pins 152 for forming structural pillars 18. Core pins 152 are coupled to a yoke plate 154 capable of lateral displacement through the action of one or more actuators 156, permitting core pins 152 to be protruded and retracted from cavity 148. As detailed in FIG. 11, core pins 152 are provided with one or more internal channels 180 to permit the communication of air to and/or from one or more corresponding outlets 182 provided on end surface 158. For example, a single internal channel 180 may communicate air to and/or from a plurality of outlets 182 provided on end surface 158. In addition to, or as an alternative, core pins 152 may present one or more outlets on a side wall proximal to end surface 158, or along the circular edge between end surface 158 and the side wall. To reduce the likelihood of material flow into internal channel 180 during the blow-molding step of the process, outlet 182 is generally dimensioned sufficiently small to prevent material backflow there-through. With this arrangement, each core pin 152 is capable of introducing and/or removing air during the formation of respective protrusions in the parison.

Yoke plate 154 is configured with a series of conduits 184 to connect internal channels 180 of core pins 152 to a suitable air pump/vacuum device 186 through plenum 188 coupled to yoke plate 154. Yoke plate 154 and/or core pins 152 may be provided with suitable seals (not shown) to prevent egress of air during use. In other embodiments, yoke plate 154 may be configured with a network of channels to form a manifold capable of delivering air from a suitable air pump/vacuum device coupled directly thereto.

Parison 50 is positioned between first and second mold halves 144, 146 of mold tool 142, with covering 34 being positioned between first mold half 144 and parison 50. Either prior to mold tool 142 closure, simultaneously with mold tool 142 closure, or subsequent to mold tool 142 closure, yoke plate 54 is displaced towards second mold half 46 so as to protrude core pins 152 from the cavity surface 160. In the embodiment shown, core pins 152 are partially protruded from cavity surface 160 prior to mold tool 142 closure, and are fully extended to the desired position prior to complete closure of mold tool 142. In other embodiments, core pins 152 are partially protruded from cavity surface 160 prior to mold tool 142 closure, and are fully extended to the desired position subsequent to complete closure of mold tool 142. In still further embodiments, core pins 152 are protruded from cavity surface 160 subsequent to complete closure of mold tool 142.

Figure 12:
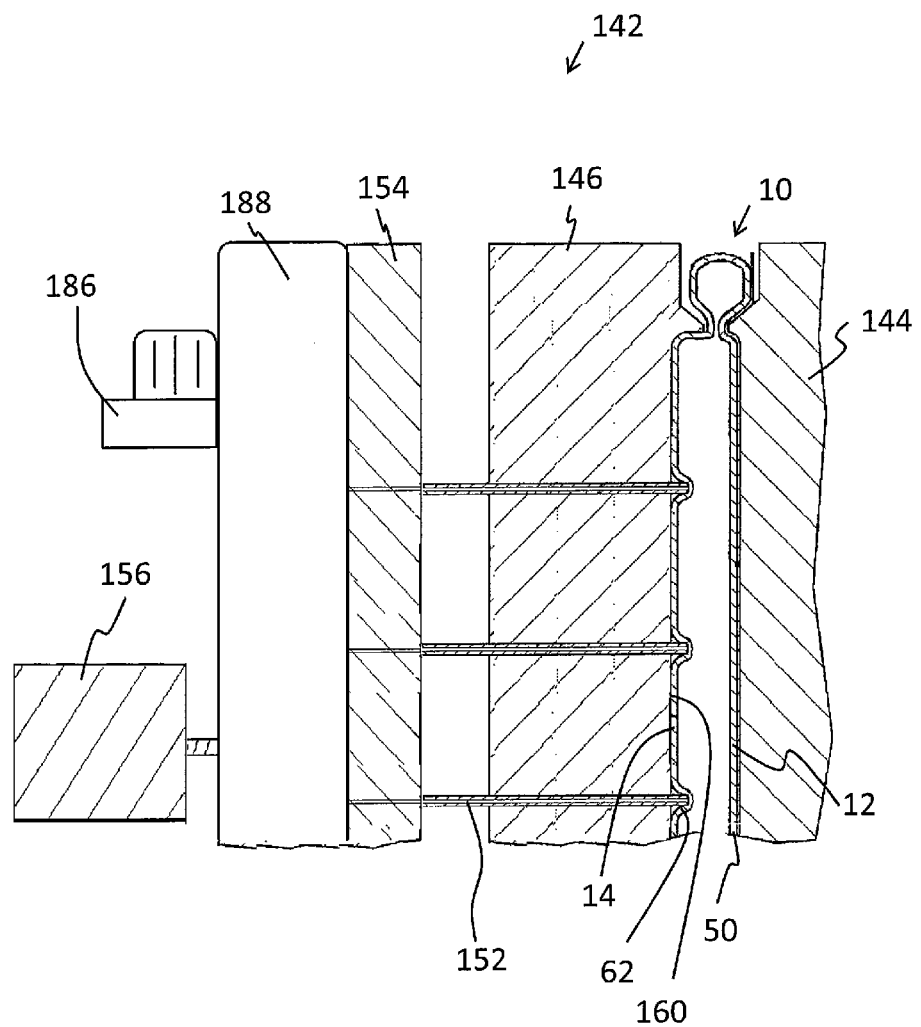
FIG. 12 is a partial sectional view of the mold tool according to FIG. 10 showing initial engagement of the parison by the core pins.
Figure 13A:
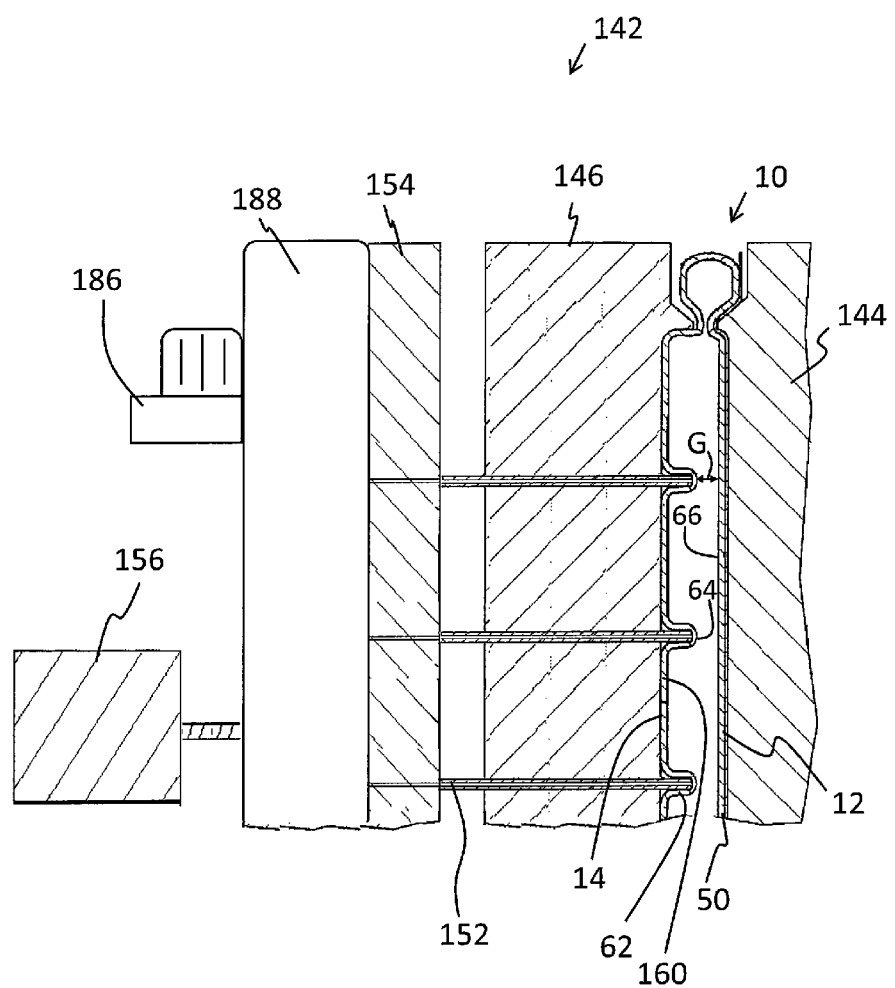
FIG. 13a is a partial sectional view of the mold tool according to FIG. 10 showing the establishment of gap distance G during formation of the protrusion.
Figure 13B:
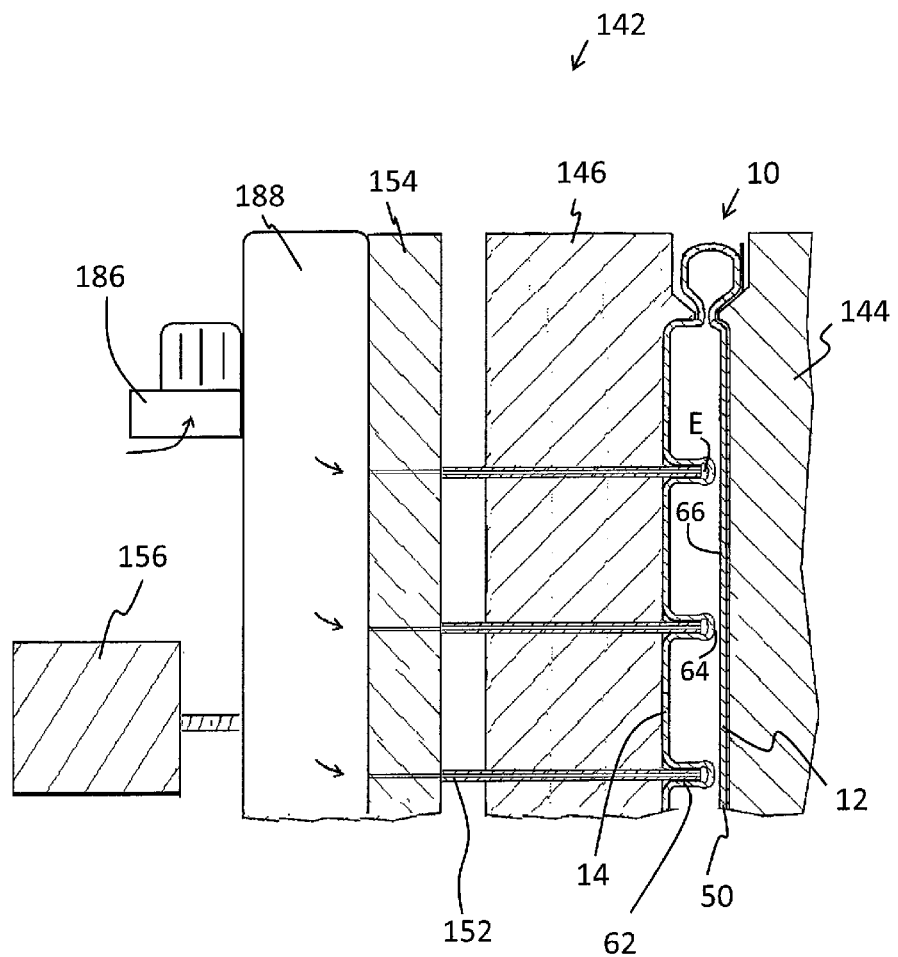
FIG. 13b is a partial sectional view of the mold tool according to FIG. 10 showing the expansion of the protrusion by directing air through channels provided in core pins.
Figure 14:
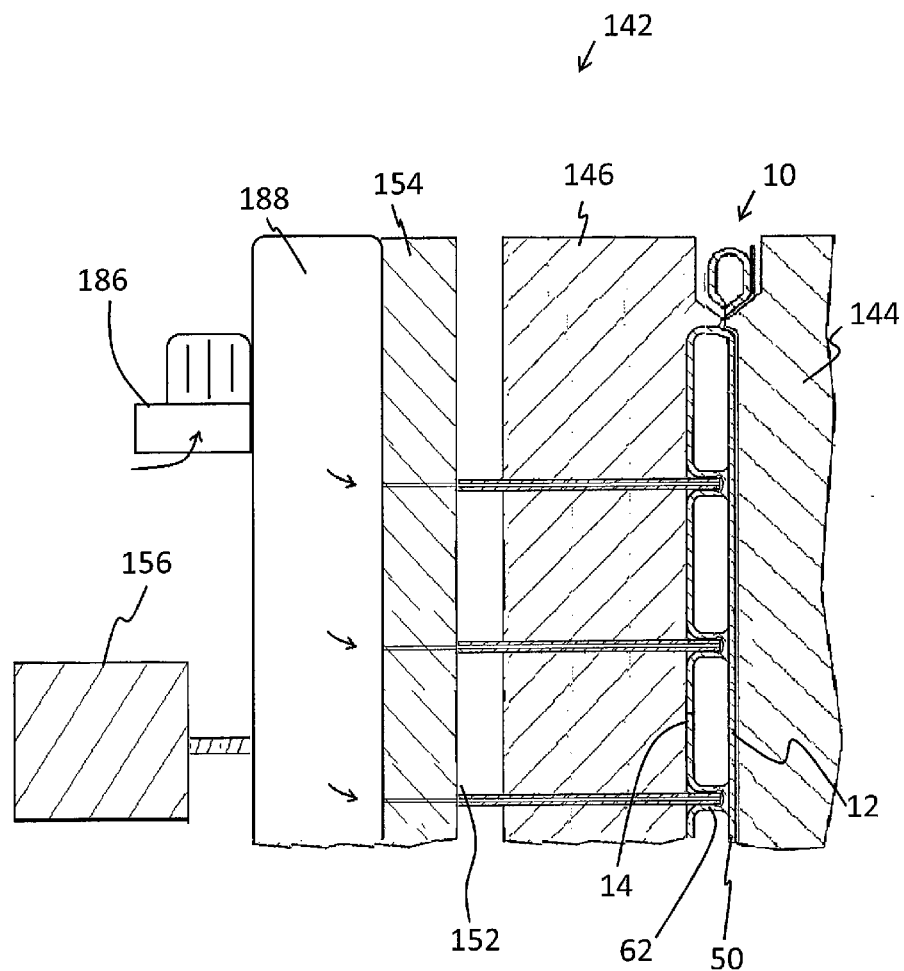
FIG. 14 is a partial sectional view of the mold tool according to FIG. 10 showing the engagement and bonding of the expanded protrusion with the inside surface of the opposing wall on mold closure.

Partial mold tool 142 closure is represented in FIG. 12 where initial engagement of parison 50 by core pins 152 is shown. Core pins 152 push localized regions of parison 50 from the side corresponding to second wall 14 of hollow article 10 towards the opposing side, that is first wall 12. On protruding into parison 50, each core pin 152 forms into parison 50 a corresponding circumferential wall 62. The extent of protrusion of core pin 152 into parison 50 is sufficient to position the end face 64 of the protrusion close to, but in spaced-apart relationship relative to inside surface 66 of first wall 12, by gap distance G (see FIG. 13*a*). On establishing gap distance G, a stream of air is introduced into protrusion through internal channel 180 of core pin 152, causing a localized expansion E of the protrusion at an end region thereof, as shown in FIG. 13*b*. The extent of the expansion is sufficient to cause end face 64 of the protrusion to engage and bond with inside surface 66 of first wall 12 on complete closure of mold tool 142, as shown in FIG. 14.

Alternatively, the airflow through internal channel 180 of core pin 152 can be continual during engagement of core pin 152 with parison, so as to create a bull-nose formation, similar to that shown in FIG. 13*b*. With the bull-nose formation provided on the end region of the protrusion, the extension of core pin 152 into parison 50 is continued until sufficient to cause end face 64 of the protrusion to engage and bond with inside surface 66 of first wall 12 on complete closure of mold tool 142, similar to that detailed in FIG. 14.

In some embodiments, complete mold tool closure preceeds airflow through internal channel 180 of core pin 152, with expansion E serving span the gap distance to complete the engagement and bonding between end face 64 of the protrusion and inside surface 66 of first wall 12. In other words, final engagement and bonding between end face 64 of the protrusion and inside surface 66 of first wall 12 may be solely a function of expansion E, without further mechanical manipulation of parison 50.

As will be appreciated, the timing of the passage of air through internal channel 180 of core pin 152 relative to the overall process is not intended to be limited to the examples provided above. For example, in some embodiments, airflow through internal channel 180 of core pin 152 may commence following complete closure of mold tool 142, for example where core pins 152 are extended and engage parison 50 only after mold tool 142 is closed. In still further arrangements, airflow through internal channel 180 may preceed, may be concurrent to or may follow either a parison preblow step and/or a full-pressure blow. For example, where core pins 152 are extended into parison subsequent to closure of mold tool 142, parison 50 may be subject to pressurization, either as a pre-blow or a full pressure blow, so as to ensure a complete seal of circumferential wall 62 to core pin 152 prior to airflow through internal channel 180.

As described in the earlier embodiment of the process, parison 50 is blow molded into the final desired article, and depending on whether or not core pins 152 are maintained within the cavity during blow molding, the various forms detailed in FIGS. 2*a* to 2*c* are obtained. With covering 34 present within mold tool 142 during the blow molding step, covering 34 is integrally bonded on outside surface of first wall 12, as shown for example in FIG. 4*a*.

In some embodiments, delivery of air through internal channels 180 of core pins 152 into protrusion is continued during retraction of core pins 152. The introduction of air into the protrusion during retraction serves to reduce the formation of a vacuum therein, reducing the likelihood of deformation (e.g. dimpling) due to vacuum suck-back, particularly on thin-walled structures.

On completion of the blow molding step, similar to FIG. 9, core pins 152 are fully retracted if still in a protruded state, and mold tool 142 is opened. The resulting hollow article 10 is removed and subjected to any required post-mold processing to remove flashing or other waste material.

The delivery of air into the protrusion through core pins 152 has several advantages. As indicated above, air may be introduced when core pins 152 reach a terminal extension point (defining gap distance G), or on a continual basis to form the aforementioned bull-nose formation. Either way, the introduction of air creates an expanded region which cushions the engagement between end surface 64 of the protrusion and inside surface 66 of parison. This cushion effect serves to reduce the likelihood of mechanical compression of the material, reducing unwanted marking or 'read-through' on surfaces generally caused by mechanical contact of molding surfaces during the molding process.

Figure 15A:
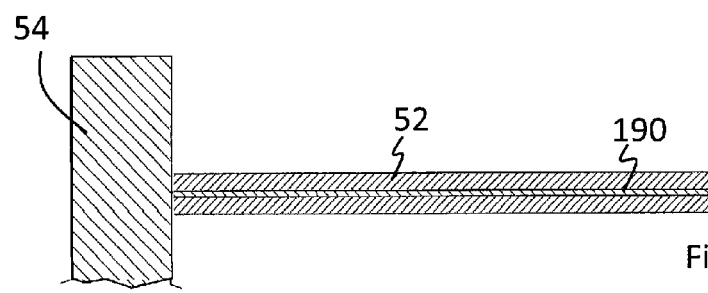
FIG. 15a is an enlarged partial sectional view of a core pin having a heater.
Figure 15B:
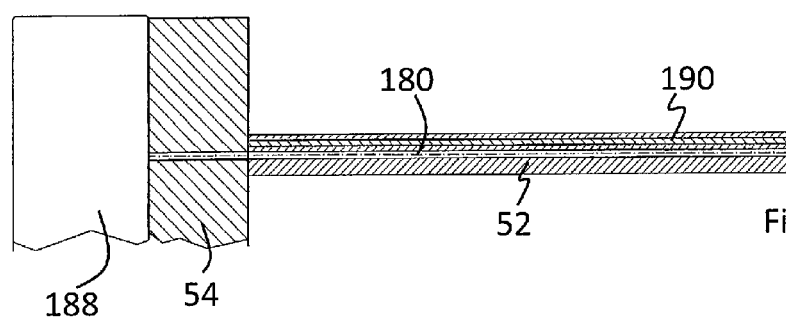
FIG. 15b is an enlarged partial sectional view of a core pin having an internal channel and heater.

In still further embodiments of the invention, core pins 52 and 152 may be provided with a heating component to deliver heat during the process of forming the protrusion into the parison. For example, as shown in FIG. 15a, core pin 52 having a solid core is provided with a heater 190, such as a resistive wire heater, or a cartridge heater, or any suitable equivalent as long as it is thermally connected to core pin 52. A similar arrangement showing the placement of heater 190 in core pin 152 (having internal channels 180) is represented in FIG. 15b. In other embodiments, heat may be provided to core pins 52 through the use of one or more heaters positioned in yoke plate 54. Regardless of the means, the addition of heat may be necessary for thermal balancing of the mold, and may in fact assist during the retraction of the pin, that is in the demolding steps of the process. The ability to introduce localized heat also has the potential to open up the processing window, giving an operator greater control during the molding process.

Figure 16A:
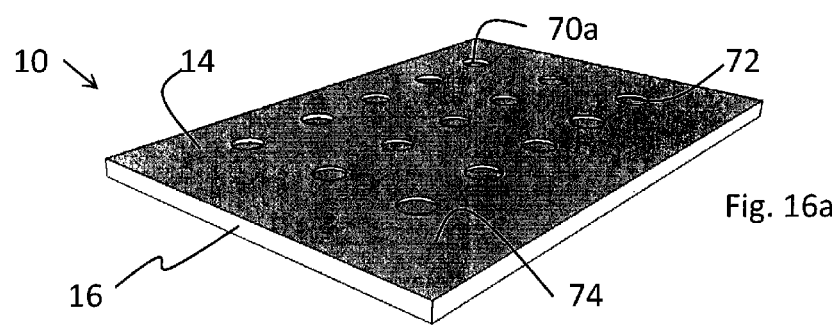
FIG. 16a is a perspective view showing second wall and the formed features corresponding to partially hollow core structural pillars, wherein each feature is presented as a recess on the outside surface.
Figure 16B:
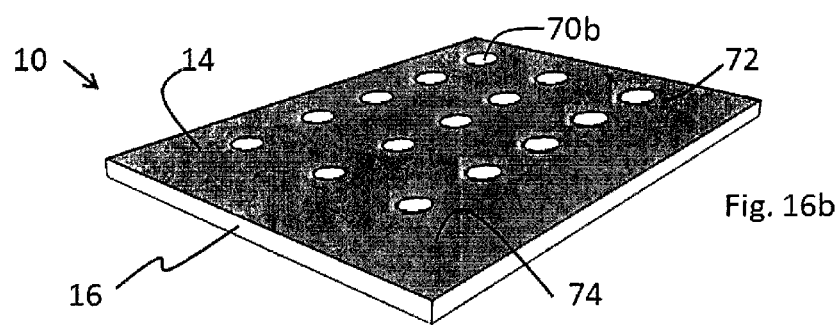
FIG. 16b is a perspective view showing second wall and the formed features corresponding to hollow core structural pillars, wherein each feature is presented as a hollow core on the outside surface.
Figure 16C:
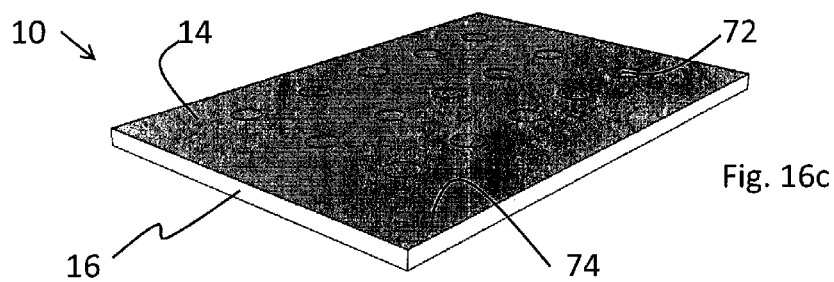
FIG. 16c is a perspective view showing second wall and the formed features corresponding to solid-core structural pillars, wherein each feature is substantially planar relative to the outside surface.
Figure 16D:
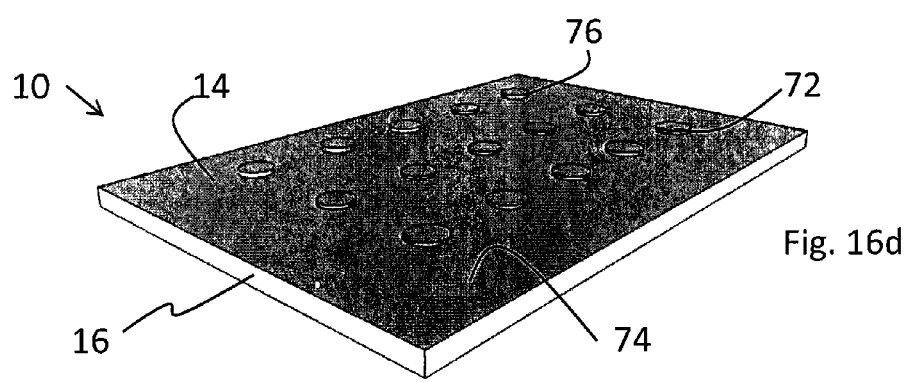
FIG. 16d is a perspective view showing second wall and the formed features corresponding to solid-core structural pillars, wherein each feature is presented as a protrusion from the outside surface.

The location of each structural pillar is noted by a corresponding feature 72 present on the outside surface 74 of second wall 14. Where structural pillar 18 is formed as a partially hollow structural pillar, that is where the core pins are partially left within the protrusion during blow molding, feature 72 is primarily in the form of a hollow bore 70a as seen in FIG. 16a. Where structural pillar 18 is formed as a hollow structural pillar, that is where the core pins are fully removed from the protrusion during blow molding, feature 72 is primarily in the form of a hollow bore 70b as seen in FIG. 16b. Where structural pillar 18 is a solid structural pillar, and core pin 52 is retracted so as to present end surface 58 as flush with cavity surface 60, feature 72 is generally presented as being planar with outside surface 74 of second wall 14, as seen in FIG. 16b. Where end surface 58 of core pins 52 are retracted further than cavity surface 60, feature 72 is presented as a protrusion 76 from outside surface 74 of second wall 14, as seen in FIG. 16c. Such protrusions on the exterior surface, that is on outside surface 74 of second wall 14 may be added as an anti-slipping feature.

Hollow article 10 is made from a thermoplastic material that has sufficient strength and rigidity to meet the desired performance characteristics. In general, the performance characteristics relate to maximizing the area moment of inertia ($MI_a$) about the plate neutral axis (NA), to obtain maximum plate stiffness (S). A non-limiting example of suitable materials includes polypropylene, polyethylene, ABS, ABS/PC, polyamide, PLA and PPS. To meet desired strength and rigidity requirements, the thermoplastic may additionally include a range of inorganic filler components, a non-limiting example of which includes glass, mica, calcium carbonate and talc, and/or organic filler components, a non-limited example of which includes jute, husk, and hemp.

The above described structural pillar technology and associated processes may be applied to a range of hollow structures. For example, while exemplified above on a load floor where first and second walls 12, 14 are generally planar and parallel, the technology may be applied to alternate configurations, for example where first and second walls 12, 14 are arranged in a non-parallel configuration. An exemplary non-parallel configuration may include an arrangements where the first and second walls follow a curvature in the hollow article but remain generally parallel throughout. Another exemplary non-parallel configuration may include an arrangement where there is a change in thickness in the article arising from a variation in distance from first wall to second wall.

Figure 17:
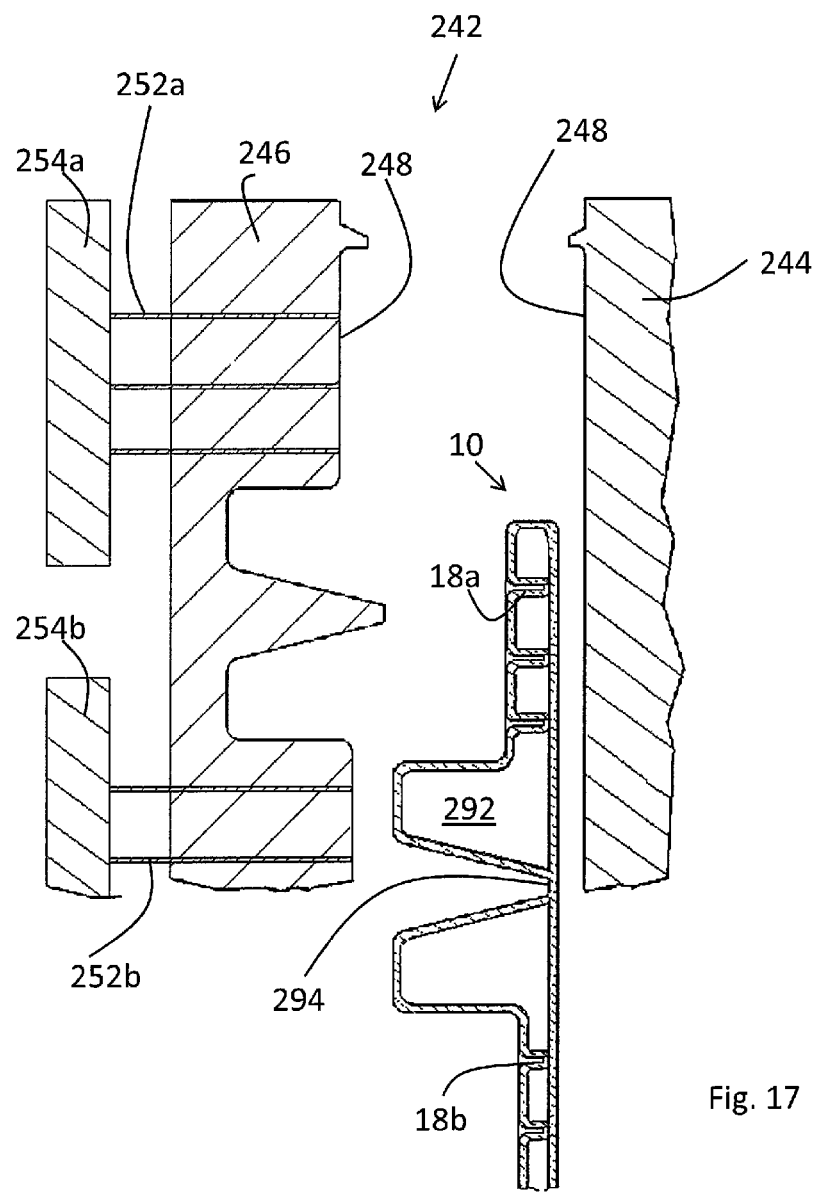
FIG. 17 is a partial sectional view of a mold tool in accordance with an embodiment hereof for forming a hollow article incorporating additional structural features and having structural pillars of different heights.

Presented in FIG. 17 is an exemplary mold tool 242 and corresponding formed hollow article 10 where structural pillars 18 are arranged on either side of a recessed portion 292 containing a tack-off structure 294. With respect to the mold tool 242, the labelled parts perform in a substantially similar manner with substantially similar functions as the embodiment illustrated in FIGS. 5 to 9, with like parts having like numbers with the addition of 200 to the corresponding number. Only differences will therefore be discussed in detail. Alterations and modifications noted above are equally applicable to the further embodiment detailed below.

As shown, mold tool 242 comprises two mold halves, namely a first mold half 244 and a second mold half 246. In a closed configuration, first and second mold halves 244, 246 together define a mold cavity 248. Provided in second mold half 246 are a plurality of slidably displaceable core pins for forming the structural pillars. The core pins are coupled to a corresponding yoke plate 254a, 254b based on the desired stroke distance, each yoke plate being capable of lateral displacement through the action of one or more actuators (not shown), permitting the core pins to be protruded and retracted from cavity 248.

In hollow article 10 shown in FIG. 17, the distance between first wall 12 and second wall 14 on each side of recess portion 292 is different, that is structural pillar 18a is longer compared to structural pillar 18b. To accommodate differences in stroke, core pins 252a are mounted on yoke plate 254a, while core pins 252b are mounted on yoke plate 254b. As will be appreciated, the structural pillar technology and processes described herein may be applied to a wide range of blow molded hollow products, including but not limited to load floors, spare tire covers, and partitions/dividers/panels in both automotive and non-automotive applications. The structural pillar technology may also find application in sound barrier/acoustical panel installations and energy absorbers.

Figure 18:
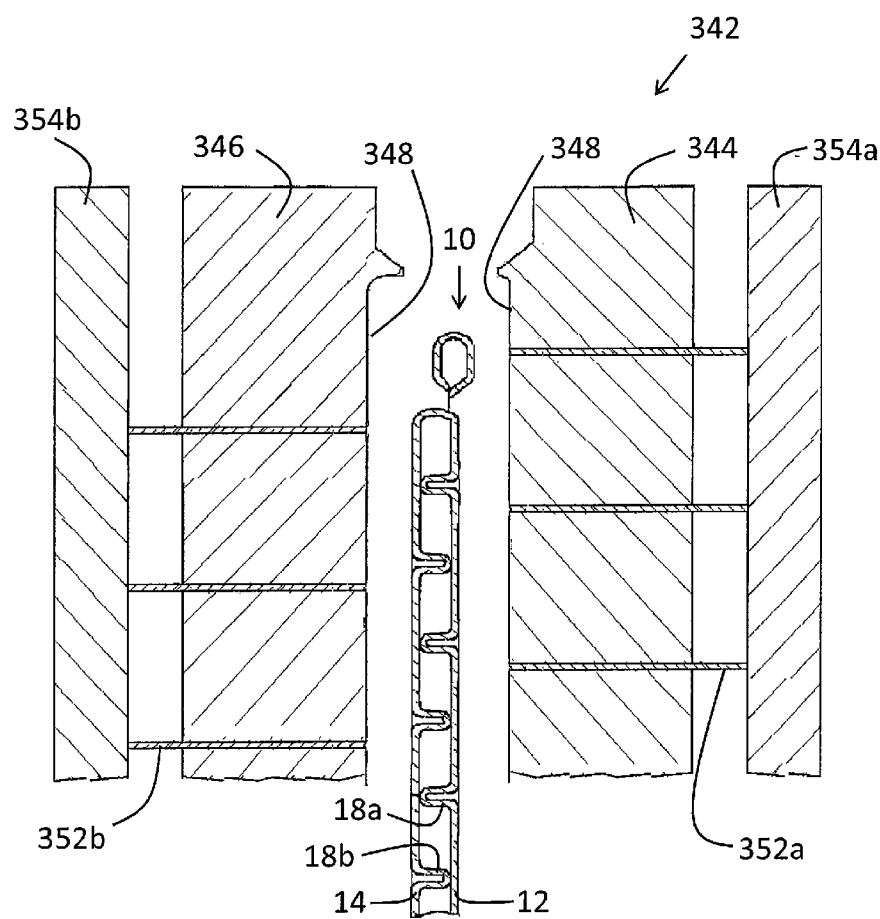
FIG. 18 is a partial sectional view of a mold tool in accordance with an embodiment hereof for forming a hollow article having structural pillars formed on both the first and second walls.

Presented in FIG. 18 is an exemplary mold tool 342 and corresponding formed hollow article 10 where structural pillars are formed on both first and second side walls 12, 14. With respect to the mold tool 342, the labelled parts perform in a substantially similar manner with substantially similar functions as the embodiment illustrated in FIGS. 5 to 9, with like parts having like numbers with the addition of 300 to the corresponding number. Only differences will therefore be discussed in detail. Alterations and modifications noted above are equally applicable to the further embodiment detailed below.

As shown, mold tool 342 comprises two mold halves, namely a first mold half 344 and a second mold half 346. In a closed configuration, first and second mold halves 344, 346 together define a mold cavity 348. Provided in first mold half 344 is a first plurality of slidably displaceable core pins 352a for engaging the parison on the side corresponding to first wall 12. Provided in second mold half 346 is a second plurality of slidably displaceable core pins 352b for engaging the parison on the side corresponding to second wall 14. The core pins 352a, 352b are coupled to respective yoke plates 354a, 354b, each yoke plate being capable of lateral displacement through the action of one or more actuators (not shown), permitting the core pins to be protruded and retracted from cavity 348. As such, the resulting a hollow article 10 provides a first set of structural pillars 18c that extend from first wall 12 and engage the inside surface of second wall 14, and a second set of structural pillars 18d that extend from second wall 14, and engage the inside surface of first wall 12.

Figure 19:
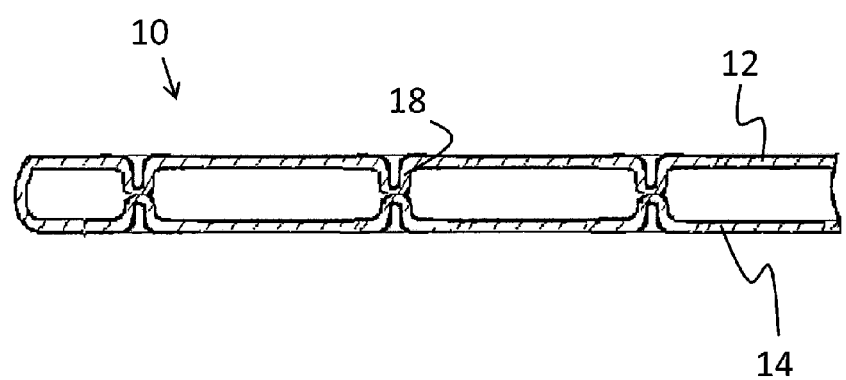
FIG. 19 is a partial sectional view of a hollow article having a hollow core structural pillar formed by protrusions extending from each side of the parison.

While the above example presents the protrusions from each side as forming an independent structural pillar, in some embodiments the mold tool is configured with aligned opposing core pins such that the protrusions extending from each side are in opposing relationship to form a hollow article 10 having structural pillars 18 as shown in FIG. 19. The extent of protrusion from each side may vary, that is the integral bond between the opposing protrusions need not be positioned on a central plane, but may be located towards one side as deemed necessary for a particular application. Since the protrusions from each side are shorter in length, a hollow article having this configuration can have a thinner wall thickness, further reducing overall weight. While exemplified as a hollow-core structural pillar, as described in previous embodiments, the structural pillar may also be configured as a solid-core structural pillar by removing the core pins prior to blow-molding.

In the processes described above, additional parison manipulation/forming steps may be incorporated. For example, preseal plates may be incorporated on the mold tool to pinch one or both of the downstream or upstream ends of the parison. On presealing the parison, an optional pre-blow operation may be used to expand the parison prior to mold closure. For certain applications, a pre-stretch of the parison may be necessary, in which case a stretcher plate may be used on the downstream end, the stretcher plate having a plurality of elongated arms that engage and stretch the parison as required. To introduce pressurized air into the parison, blow needles or tubes may be arranged from either the top, bottom or sides of the mold tool.

While the exemplary embodiments presented above show the core pins as having a circular cross-section, it will be appreciated that non-circular cross-sectional profiles may also be used. For example, the core pins may have cross-sectional profiles such as, but not limited to oval, square, cruciform, and any polygonal configuration such as, but not limited to pentagonal, hexagonal and octagonal.

While the structural pillars shown herein have been exemplified as having a substantially constant cross-sectional diameter along the length dimension, in some embodiments, the cross-section of the pillar may vary in diameter or average width. In other words, in some embodiments, the outside surface of the circumferential walls of the structural pillar may not be parallel along the length dimension, such as for example when the structural pillar is presented as having an 'hour-glass'-like shape.

While the solid-core structural pillars shown herein have been exemplified as being substantially solid throughout, in some embodiments the solid-core structural pillars may comprise additional voids wherein no thermoplastic material is present.

While the various processes exemplified above have a covering included in the forming of the hollow structure, it will be appreciated that the covering is optional.

While various embodiments according to the present invention have been described above, it should be understood that they have been presented by way of illustration and example only, and not limitation. It will be apparent to persons skilled in the relevant art that various changes in form and detail can be made therein without departing from the scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other combination. All patents and publications discussed herein are incorporated by reference herein in their entirety.

The invention claimed is:

1. A process for producing a hollow article having a pair of spaced walls, the process comprising:
   positioning a parison between a first mold half and a second mold half, said first mold half and second mold half together defining a cavity for forming said hollow article, said second mold half having a plurality of displaceable core pins extendable into said cavity,
   configuring the core pins in a predetermined spaced geometric array,
   closing said first mold half and second mold half,
   extending said core pins, thereby pushing localized regions of said parison so as to form corresponding protrusions in said parison, the protrusions defining a corresponding geometric array of structural pillars that join the spaced walls, the spacing density of the structural pillars being determined as a function of desired structural rigidity of the article,
   expanding an end region of each protrusion through the introduction of air through one or more internal channels provided in each corresponding core pin, the expansion being sufficient to cause an end surface of said protrusion to engage and integrally bond with an opposing inside surface of said parison on complete mold tool closure,
   introducing a pressurized gas into said parison so as to cause said parison to bear against said cavity to form said hollow article,
   opening said first and second mold half, allowing said hollow article formed therein to be released.

2. The process according to claim 1, wherein said core pins are at least partially extending from said second mold half into said cavity prior to mold tool closure.

3. The process according to claim 1 wherein said core pins are fully extended prior to complete mold tool closure.

4. The process according to claim 1, wherein said introduction of air through each corresponding core pin occurs on the establishment of a predetermined gap distance between said end surface of said protrusion and said opposing inside surface of said parison.

5. The process according to claim 1, wherein said introduction of air through each corresponding core pin is continuous during the engagement of said core pins with said parison, forming a bullnose formation on an end region thereof.

6. The process according to claim 1, wherein a covering to be integrally bonded to said hollow article is positioned between said parison and said first mold half.

7. The process according to claim 1, wherein a second plurality of displaceable core pins are provided in said first mold half, said second plurality of displaceable core pins being extendable into said cavity so as to form additional structural pillars in said hollow article from an opposing side.

8. The process according to claim 1, wherein said core pins are maintained in the extended position on introducing said pressurized gas to form structural pillars having a hollow core.

9. The process according to claim 1, wherein said core pins are retracted into said second mold half prior to introducing said pressurized gas, such that the inside wall of each of said structural pillars is collapsed and integrally bonded to form a solid core.

10. A process for producing a hollow article having a pair of spaced walls, the process comprising:
    positioning a parison between a first mold half and a second mold half, said first mold half and second mold half together defining a cavity for forming said hollow article, said second mold half having a plurality of displaceable core pins extendable into said cavity, configuring the core pins in a predetermined spaced geometric array, closing said first mold half and second mold half, extending said core pins, thereby pushing localized regions of said parison so as to form corresponding protrusions in said parison, the protrusions defining a corresponding geometric array of structural pillars that join the spaced walls, said geometric array having a variable spacing density of said structural pillars to provide said hollow article with regions of high structural pillar density arrangement, and regions of low structural pillar density arrangement to achieve the desired structural rigidity of the article, each structural pillar having an end surface that engages and integrally bonds with an opposing inside surface of said parison, introducing a pressurized gas into said parison so as to cause said parison to bear against said cavity to form said hollow article, opening said first and second mold half, allowing said hollow article formed therein to be released.

11. The process according to claim 10, wherein said core pins are at least partially extending from said second mold half into said cavity prior to mold tool closure.

12. The process according to claim 10 wherein said core pins are fully extended prior to complete mold tool closure.

13. The process according to claim 10, further comprising expanding the end region of each protrusion through the introduction of air through each corresponding core pin, the expansion being sufficient to cause said end surface to engage and integrally bond with said opposing inside surface of said parison on complete mold tool closure.

14. The process according to claim 13, wherein said introduction of air through each corresponding core pin occurs on the establishment of a predetermined gap distance between said end surface of said protrusion and said opposing inside surface of said parison.

15. The process according to claim 13, wherein said introduction of air through each corresponding core pin is continuous during the engagement of said core pins with said parison, forming a bullnose formation on an end region thereof.

16. The process according to claim 10 wherein a covering to be integrally bonded to said hollow article is positioned between said parison and said first mold half.

17. The process according to claim 10, wherein a second plurality of displaceable core pins are provided in said first mold half, said second plurality of displaceable core pins being extendable into said cavity so as to form additional structural pillars in said hollow article from an opposing side.

18. The process according to claim 10, wherein said core pins are maintained in the extended position on introducing said pressurized gas to form structural pillars having a hollow core.

19. The process according to claim 10, wherein said core pins are retracted into said second mold half prior to introducing said pressurized gas, such that the inside wall of each of said structural pillars is collapsed and integrally bonded to form a solid core.

* * * * *